(12) United States Patent
Armato, III et al.

(10) Patent No.: US 6,335,980 B1
(45) Date of Patent: Jan. 1, 2002

(54) METHOD AND SYSTEM FOR THE SEGMENTATION OF LUNG REGIONS IN LATERAL CHEST RADIOGRAPHS

(75) Inventors: Samuel G. Armato, III, Chicago; Maryellen L. Giger, Elmhurst; Heber Macmahon, Chicago, all of IL (US)

(73) Assignee: Arch Development Corporation, Chicago, IL (US)

( * ) Notice: Subject to any disclaimer, the term of this patent is extended or adjusted under 35 U.S.C. 154(b) by 0 days.

(21) Appl. No.: 09/471,088

(22) Filed: Dec. 23, 1999

Related U.S. Application Data

(63) Continuation of application No. 08/900,189, filed on Jul. 25, 1997.

(51) Int. Cl.[7] .................................................. G06K 9/00
(52) U.S. Cl. ........................ 382/132; 382/169; 382/173; 382/266; 600/443
(58) Field of Search .................................. 382/100, 128, 382/132, 169, 173, 260, 256, 266; 378/37, 8; 600/425, 443

(56) References Cited

U.S. PATENT DOCUMENTS

| | | | |
|---|---|---|---|
| 4,907,156 A | 3/1990 | Doi et al. | 382/128 |
| 5,133,020 A | 7/1992 | Giger et al. | 382/128 |
| 5,452,367 A | 9/1995 | Bick et al. | 382/128 |
| 5,537,485 A | 7/1996 | Nishikawa et al. | 382/130 |
| 5,638,458 A | 6/1997 | Giger et al. | 382/132 |
| 5,657,362 A | 8/1997 | Giger et al. | 378/37 |
| 5,832,103 A | 11/1998 | Giger et al. | 382/130 |
| 5,881,124 A | 3/1999 | Giger et al. | 378/8 |
| 5,974,165 A | 10/1999 | Giger et al. | 382/132 |
| 5,984,870 A | 11/1999 | Giger et al. | 600/443 |
| 6,112,112 A | 8/2000 | Gilhuijs et al. | 600/425 |
| 6,138,045 A | 10/2000 | Kupinski et al. | 600/425 |
| 6,141,437 A | 10/2000 | Xu et al. | 382/130 |
| 6,185,320 B1 | 2/2001 | Bick et al. | 382/132 |

*Primary Examiner*—Jayanti K. Patel
(74) *Attorney, Agent, or Firm*—Oblon, Spivak, McClelland, Maier & Neustadt, P.C.

(57) ABSTRACT

A method and system for the automated segmentation of the lung regions in lateral chest radiographs. This is achieved according to the invention by providing an improved computerized, automated method for image segmentation based on gray-level threshold analysis. A unique method for identifying an approximate outer bounds on the extent of the lung fields in the image is performed to restrict the region further analyzed. An iterative global gray-level thresholding method is applied based on the features of a global gray-level histogram. Features of the regions in a binary image constructed at each iteration are identified and subjected to a modified analysis to exclude regions external to the lung field. The initial lung region contour that results from this global process is used to facilitate a novel adaptive local gray level thresholding method. Individual regions-of-interest (ROIs) are placed along the initial contour. The dimensions of the several ROIs are based upon the patient anatomy enclosed therein. A unique procedure is implemented to determine the single gray-level threshold to be applied to the pixels within the individual ROIs. A composite binary image results, and a final contour is constructed to enclose "on" regions thereof. Smoothing processes are applied, including a unique adaptation of a rolling ball method, and fitted polynomial curves are spliced into the final contour.

44 Claims, 13 Drawing Sheets

| CATEGORY | ANATOMIC REGION | ROI SIZE | THRESHOLD VALUE |
|---|---|---|---|
| 1 | LUNG APEX | 31 X 61 | AVERAGE GRAY LEVEL OF ROI PIXELS OUTSIDE INITIAL CONTOUR BUT NOT IN DIRECT-EXPOSURE OR SUBCUTANEOUS REGIONS |
| 2 | LUNG APEX POINT | 31 X 61 | GRAY LEVEL OF PIXEL PREVIOUSLY DEFINED AS LUNG APEX POINT |
| 3 | APEX/STERNUM | 31 X 31 | WEIGHTED AVERAGE OF THRESHOLDS IN ADJACENT ROIs |
| 4 | STERNUM | 31 X 31 | AVERAGE GRAY LEVEL OF ROI PIXELS NOT IN DIRECT-EXPOSURE OR SUBCUTANEOUS REGIONS |
| 5 | CARDIAC SILHOUETTE | VARIABLE X 31 | ROW-BY-ROW GRAY LEVEL ANALYSIS |
| 6 | DIAPHRAGM | 31 X 46 | AVERAGE GRAY LEVEL OF ROI PIXELS; AVERAGE OF THRESHOLDS FROM 3 CONSECUTIVE ROIs, IF GREATER |
| 7 | COSTOPHRENIC ANGLE | 45 X 61 | AVERAGE GRAY LEVEL OF ROI PIXELS NOT IN DIRECT-EXPOSURE OR SUBCUTANEOUS REGIONS |
| 8 | SPINE | 31 X 31 | AVERAGE GRAY LEVEL PLUS 1 STANDARD DEVIATION OF ROI PIXELS NOT IN DIRECT-EXPOSURE OR SUBCUTANEOUS REGIONS; THRESHOLD MUST BE WITHIN 40 OF NEIGHBORING ROIs |
| 9 | APEX/SPINE | 46 X 76 | AVERAGE GRAY LEVEL PLUS 1/2 STANDARD DEVIATION OF ROI PIXELS NOT IN DIRECT-EXPOSURE OR SUBCUTANEOUS REGIONS |

FIG.6

METHOD AND SYSTEM FOR THE SEGMENTATION OF LUNG REGIONS IN LATERAL CHEST RADIOGRAPHS

This application is a continuation of Ser. No. 08/900,189, filed Jul. 25, 1997.

The present invention was made in part with U.S. Government Support Under grant numbers CA48985 and T32 CA09649 from the USPHS (National Cancer Institute, National Institutes of Health, and Department of Health and Human Services. The U.S. Government has certain rights in the invention.

BACKGROUND OF THE INVENTION

1. Field of the Invention

The invention relates generally to a method and system for an improved computerized, automatic segmentation of the lung regions in lateral chest radiographs. Novel techniques in the segmentation of the lung regions include adaptive local thresholding.

The present invention generally relates to CAD techniques for automated detection of abnormalities in digital images, for example as disclosed in one or more of U.S. Pat. Nos. 4,839,807; 4,841,555; 4,851,984; 4,875,165; 4,907,156; 4,918,534; 5,072,384; 5,133,020; 5,150,292; 5,224,177; 5,289,374; 5,319,549; 5,343,390; 5,359,513; 5,452,367; 5,463,548; 5,491,627; 5,537,485; 5,598,481; 5,622,171; 5,638,458; as well as U.S. applications Ser. Nos. 08/158,388; 08/173,935; 08/174,175; 08/220,917; 08/393,779; 08/398,307; 08/428,867; 08/523,210; 08/536,149; 08/536,450; 08/536,794; 08/515,798; 08/562,087; 08/673,502; 08/757,611; 08/758,438; 08/900,191 filed Jul. 25, 1997; Ser No. 08/900,361 filed Jul. 25, 1997; Ser. No. 08/900,362 filed Jul. 25, 1997; Ser. No. 08/900,188 filed Jul, 25, 1997; and Ser. No. 08/900,192 filed Jul. 25, 1997. The present invention includes use of technologies referenced and described therein, as well as described in the references identified in the appended APPENDIX and cross-referenced throughout the specification by reference to the number, in brackets, of the respective reference listed in the APPENDIX, the entire contents of which, including the related patents and applications listed above and references listed in the APPENDIX, are incorporated herein by reference.

2. Discussion of the Background

Although a conventional radiographic chest examination consists of both posteroanterior (PA) and lateral projections, the use of the PA image for current digital image processing techniques is a logical approach. In contrast to the lateral image, the PA image demonstrates well-defined anatomic borders, especially along the lung apices, lateral margins, diaphragmatic borders, and cardiac silhouette. The mediastinal/lung interface is also clearly defined in the PA image. The PA configuration projects each lung field to a distinct region of the film, while the lateral projection superimposes information from both lungs and from mediastinal structures to essentially the same location on the film. Accordingly, the PA radiograph is generally more sensitive for the detection of lung pathology.

However, despite these differences, the clinical utility of the lateral radiograph is well-established [1-7]. The lateral view often provides important diagnostic information that contributes to clinical diagnosis. Computer-aided diagnostic (CAD) schemes are likely to benefit from the clinically relevant radiographic information contained in lateral images. It is quite conceivable that proper segmentation of the lung region from lateral chest images could lead to the development of a new spectrum of CAD methods while contributing another dimension to current CAD schemes. For example, radiographic characteristics of the retrosternal clear space and the retrocardiac region of lateral chest images could be automatically analyzed to assess conditions such as emphysema, cardiomegaly, or pleural effusion, or nodule candidates selected by current PA-image-based lung nodule detection schemes could be confirmed based on analysis of corresponding regions in the lateral image.

SUMMARY OF THE INVENTION

Accordingly, an object of this invention is to provide a method and system for segmenting lung regions in lateral chest images.

Another object of this invention is to provide an automated method and system for the adaptive local thresholding of images.

These and other objects are achieved according to the invention by providing a new and improved automated method and system in which a segmentation of lung regions within a lateral chest image is performed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6 is a table summarizing the dimensions and threshold value calculations by location category for adaptive local thresholding ROIs;

DETAILED DESCRIPTION OF THE PREFERRED EMBODIMENTS

Figure 1:
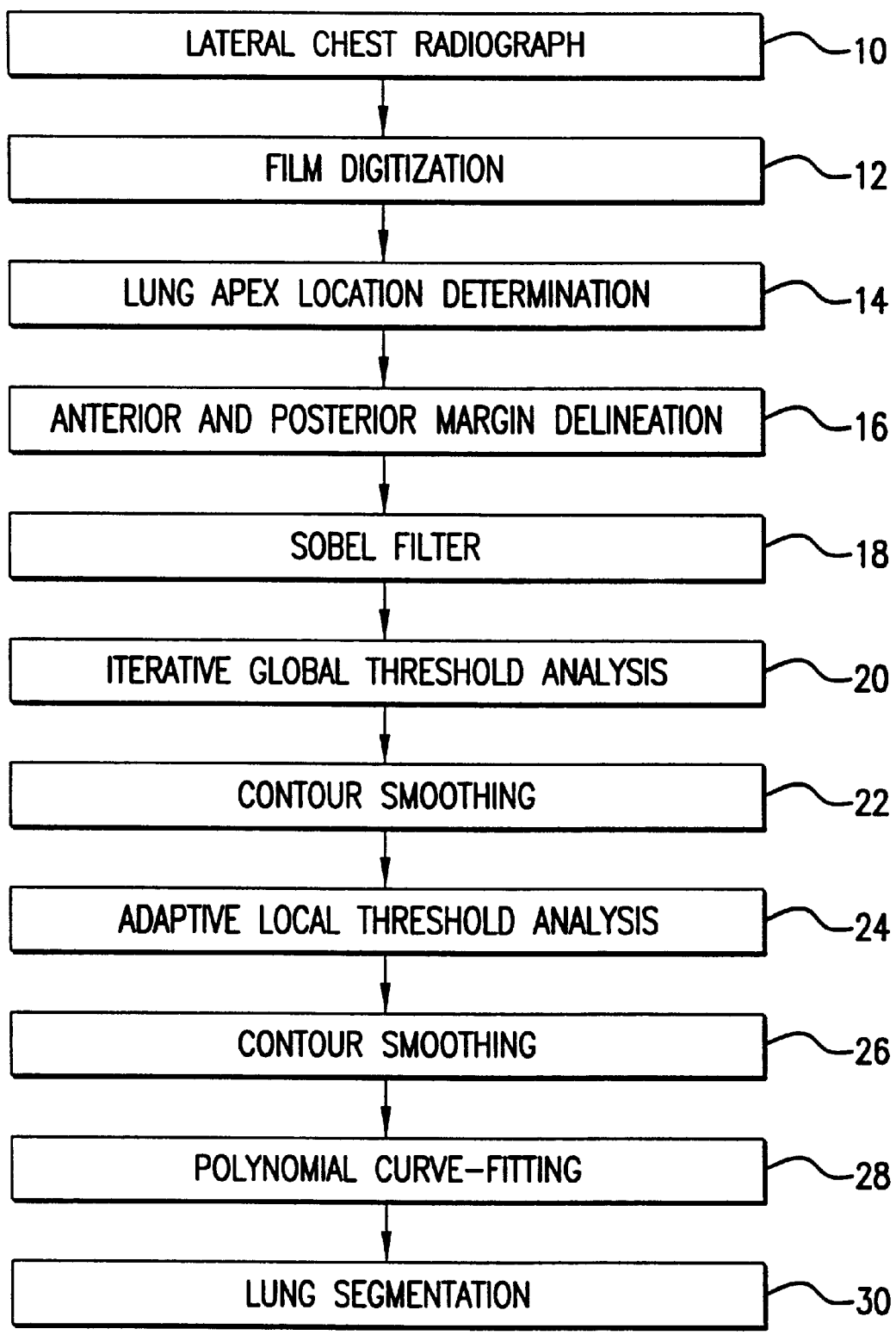
FIG. 1 is a schematic diagram illustrating the automated method for the segmentation of the lung fields in lateral chest images.
Figure 2A:
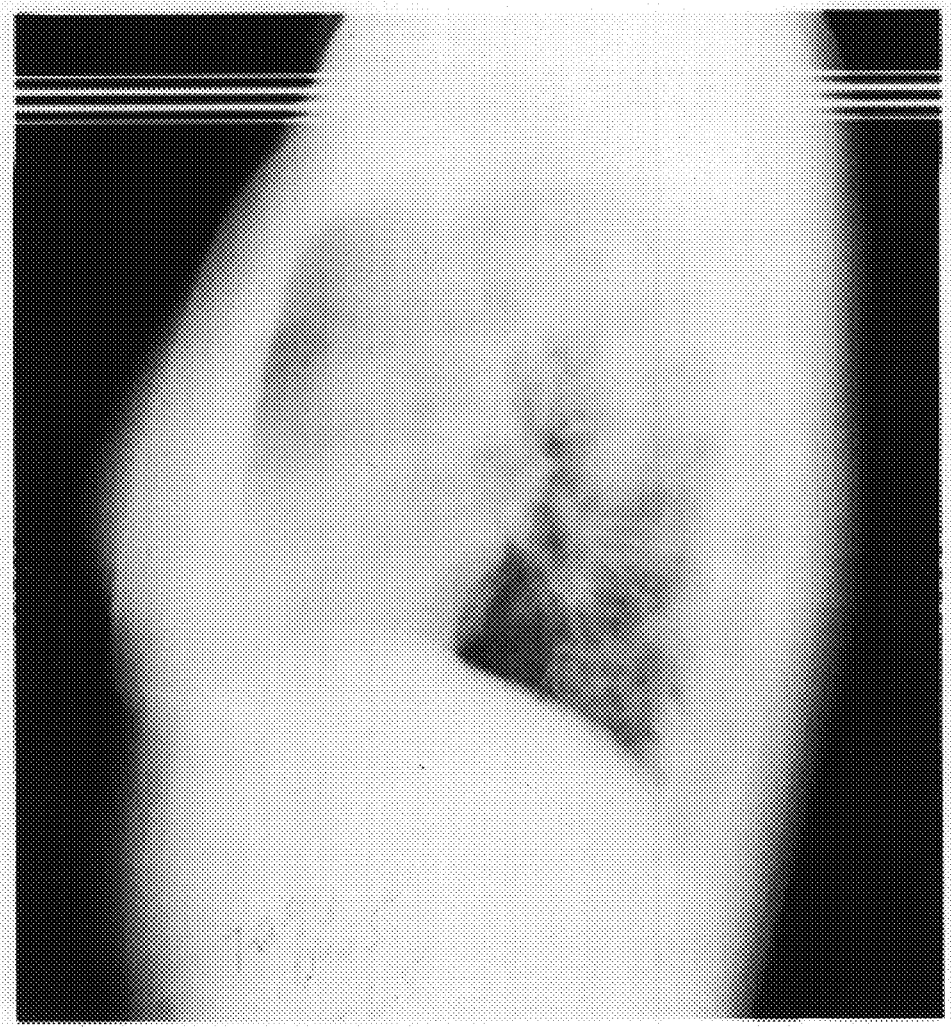
FIG. 2 is a diagram illustrating the determination of the lung apex, with row-averaged horizontal gray-level profiles shown for three sets of five consecutive rows.
Figure 2B:
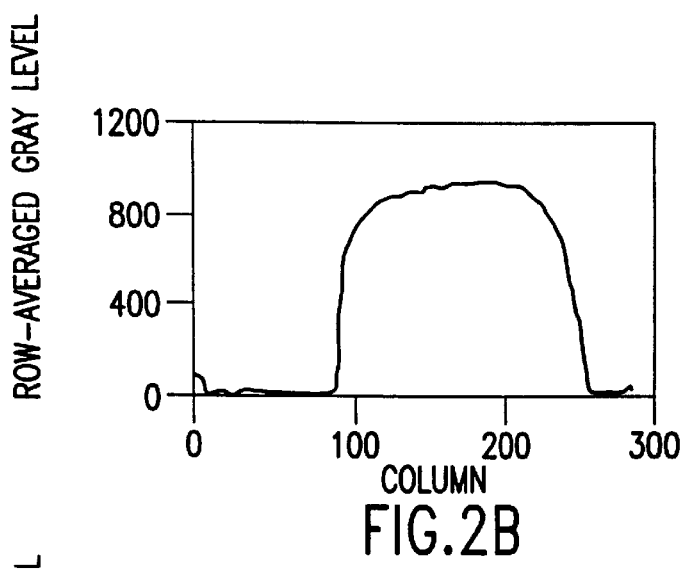
Figure 2C:
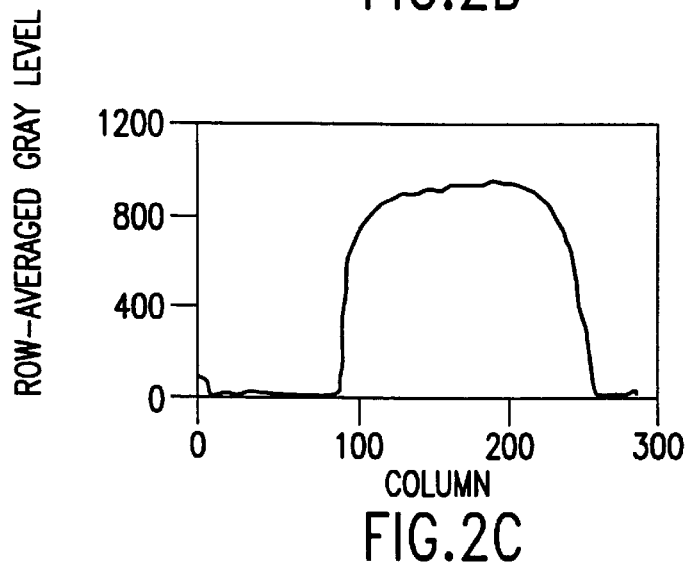
Figure 2D:
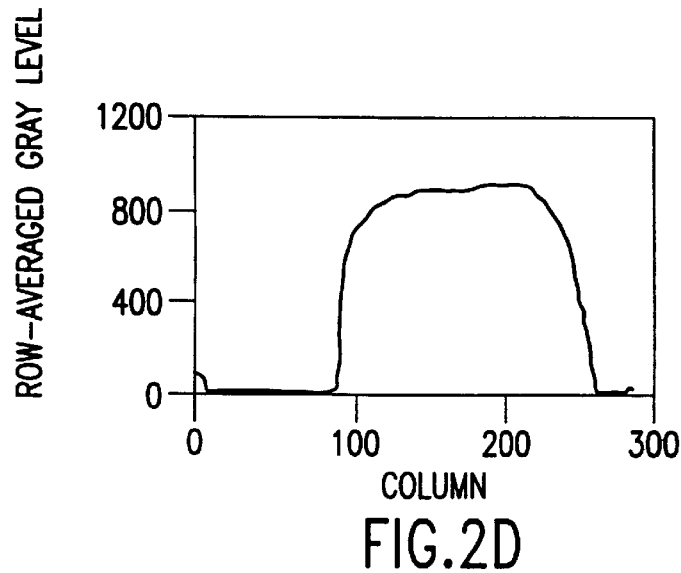

Referring now to the drawings, wherein like reference numerals refer to identical or corresponding parts in the several views, and more particularly to FIG. 1 thereof, a schematic diagram of the automated method for the detection and classification of masses in breast images is shown. The overall scheme includes an initial acquisition of a lateral radiographic image (step 10) and digitization (step 12). Next the location of the lung apex is determined (step 14). Direct-exposure and subcutaneous pixels are suppressed and an initial anterior and posterior margin are determined (step 16). A Sobel filter is applied as a final pre-processing step (step 18). Global gray-level thresholding is performed (step 20), and the resulting initial contour is subjected to smoothing processes (step 22), which include running mean and rolling ball techniques. Adaptive local gray-level thresholding is performed next (step 24). Smoothing processes are applied to the resulting contour (step 26). Third-order least-squares polynomials are independently constructed for the anterior and posterior aspects of the contour (step 28). The calculated curve segments are spliced into the final contour (step 30), thereby achieving lung segmentation.

FIG. 2 illustrates how the location of the lung apex in the image is first determined. Row-averaged horizontal gray-level profiles from three sets of five consecutive rows are derived for a normal lateral image, as shown in FIG. 2. While the position of the apex in both the anteroposterior (horizontal) and cranio-caudal (vertical) directions is incorporated in the scheme, the vertical position is the more crucial, since it establishes an upper bound on the region of the image representing lung. The horizontal position is used later during local thresholding to identify the region-of-interest (ROI) overlapping the lung apex. Moreover, since the visual appearance of the lung apex on lateral radiographs is rather indistinct, determining the position of the apex ensures that the region is given proper consideration by the segmentation scheme. The computer-determined lung apex location is indicated by a "+" symbol.

As noted, a series of row-averaged horizontal gray-level profiles is constructed for the upper one-third of the image by considering groups of rows five at a time as demonstrated in FIG. 2. The profiles are then analyzed for gray-level maxima and minima. The y-position of the apex is identified as the superiormost row yielding a profile with a minimum between two maxima, provided that this minimum has a gray level less than 97% the gray level of the smaller of the two maxima. The x-position of the apex is taken to be the horizontal position of this minimum.

An initial segmentation begins by suppressing direct-exposure pixels and subcutaneous regions with an accuracy sufficient for the intentional coarse nature of this step. These regions are first identified and suppressed as follows. Collimation along the bottom of the image is identified by inferior rows in which edge pixels have values greater than 800; all pixels are set to 0 in these rows. Additional rows extending superiorly continue to be set to 0 until a row with an edge pixel value below 40 is encountered. Side collimation is identified by rows in which edge pixels have values greater than 100 and pixels further from the edge descend in value below 40; in each such row, pixels extending from the edge are set to 0 until a pixel with value below 40 is reached.

In order to identify the direct-exposure portion of each row in the image, the following rules are employed. Pixels extending posteriorly from the anterior edge of the image (excluding pixels previously set to 0 due to collimation) are checked until a pixel is reached with value greater than twice the smallest gray level encountered prior to that pixel in the row. All pixels anterior to this pixel are set to 0. Then, to suppress the subcutaneous portion of the row, the average of the next 40 pixels is calculated, and pixels extending posteriorly are set to 0 until a pixel possessing a value greater than this average is encountered. Direct-exposure and subcutaneous pixels are suppressed from the posterior side of the image in the same manner.

Figure 3A:
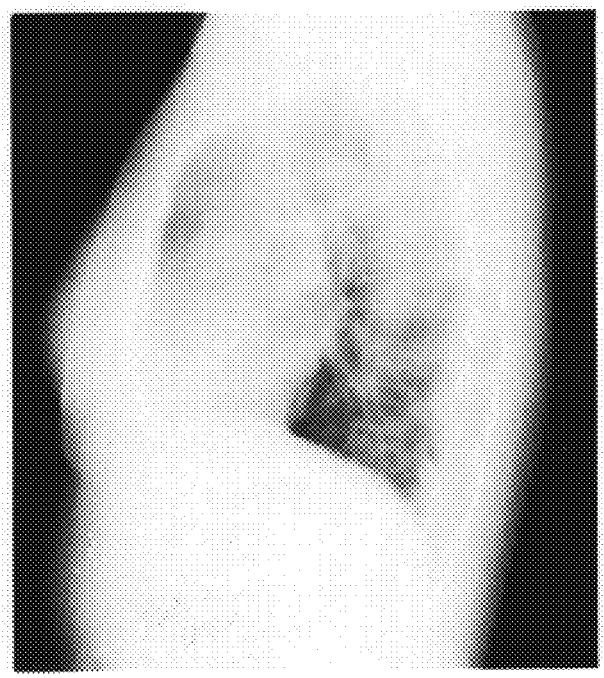
FIG. 3 is a diagram illustrating the delineation of the anterior and posterior margins with (a) illustrating the initial margin points and (b) illustrating the smoothed delineations.
Figure 3B:
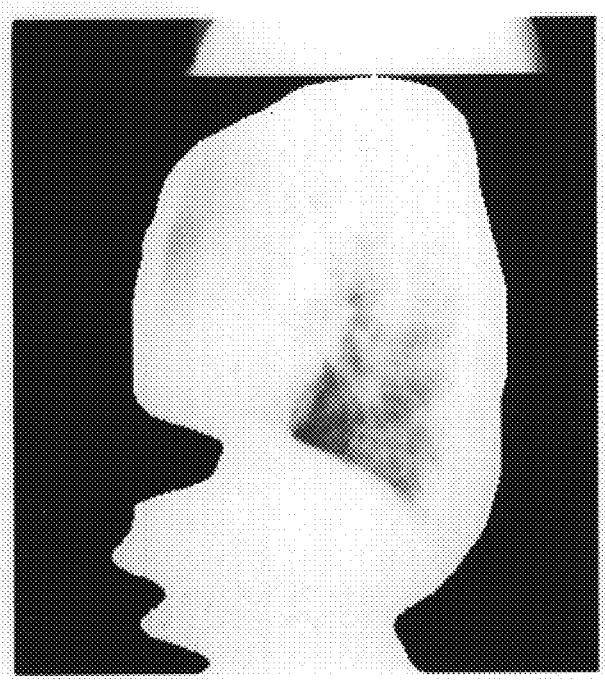

Gray-level profile analysis is performed on the remaining, non-zero pixels in each row to further delineate anterior and posterior margins. For the anterior margin, the pixel extending posteriorly with the largest gray level prior to a decrease in pixel gray levels is selected as the initial margin point. This is performed for all rows below the previously determined apex point. FIG. 3(a) shows these initial margin points superimposed on the image of FIG. 2. A running mean operation extending two rows above and below the operating row is iteratively performed on this collection of points until a continuous margin is formed. The result is a contour that tends to converge to a rough delineation of the lung border. The posterior margin is similarly determined. Pixels outside these margins are then set to 0 (FIG. 3(b)), and later steps of the scheme are only allowed to operate on pixels within the margins.

A final pre-processing step is the application of a Sobel filter [8] to the lower half of the image. Image pixels yielding values for the horizontal component of the Sobel filter greater than a threshold of 150 are assigned a high pixel value. This produces an artificially accentuated diaphragmatic border, which helps prevent the lung contours from merging with bowel gas. As a result of the Sobel filtering process, a variety of structures are accentuated, with some portion of the diaphragm tending to be the most consistently highlighted of these structures.

A global gray-level histogram is constructed from the pixels within a large, rectangular ROI located near the central portion of the image [9].

Figure 4:
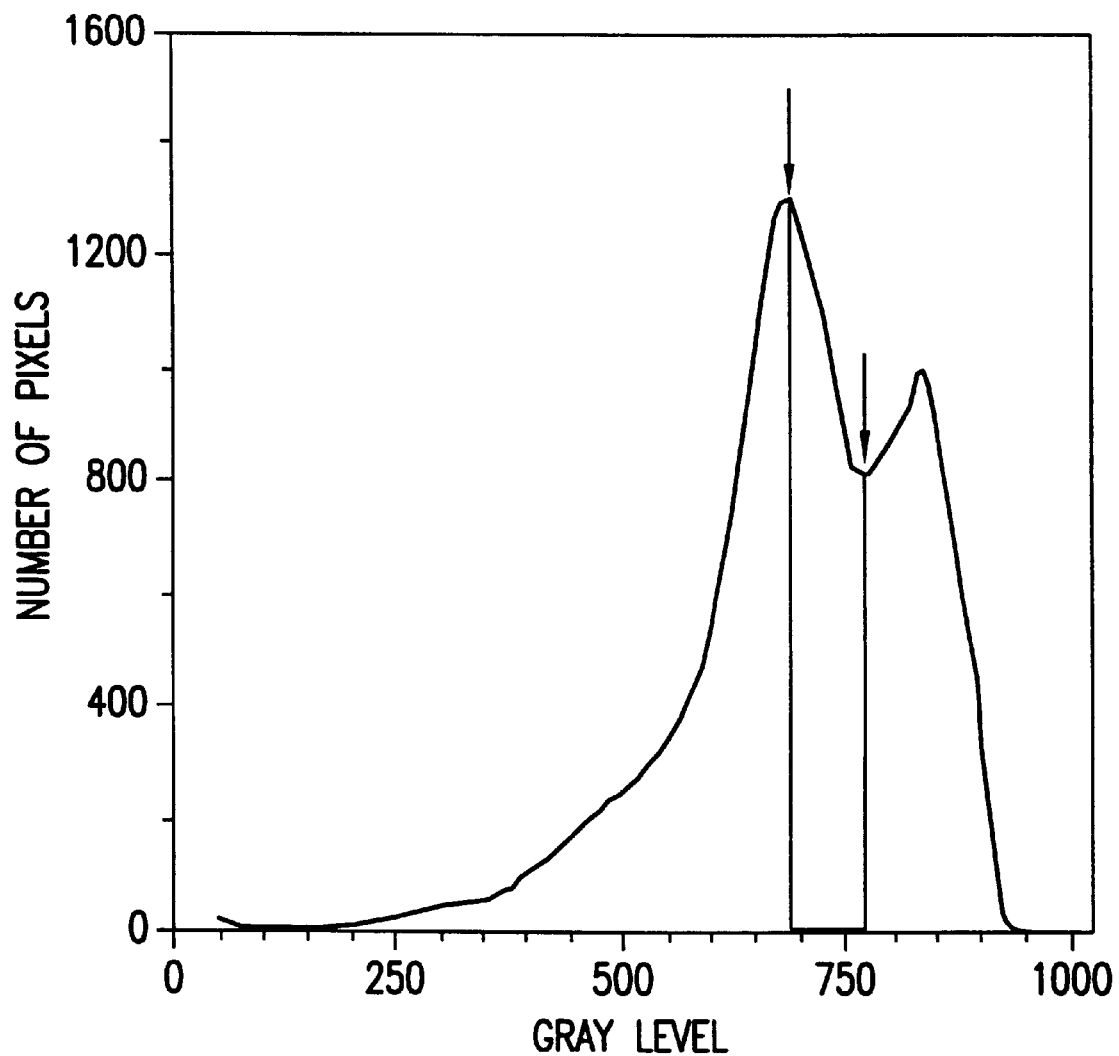
FIG. 4 is a diagram illustrating a typical global gray-level histogram for lateral chest images, identifying the range of gray levels used during iterative global gray-level thresholding.

FIG. 4 illustrates a global gray-level histogram for the image shown in FIG. 2. FIG. 4 demonstrates that this histogram tends to be bimodal, with a peak centered at a low gray level (i.e., high optical density) corresponding predominantly to pixels within the lung and a peak centered at a high gray level (i.e., low optical density) corresponding mainly to pixels in the subdiaphragmatic, shoulder, spine, and sternal regions. In order to perform the iterative global gray-level thresholding technique, a range of such thresholds must first be identified. The range of thresholds to be used for iteratively thresholding is defined by the gray levels at which the lung peak and the minimum between the peaks occur. In particular, the gray level at which the lung peak is centered in the histogram is selected as the minimum threshold, and the maximum threshold is chosen as the gray level corresponding to the minimum between the two histogram peaks (FIG. 4).

Seven gray-level thresholding iterations are performed corresponding to seven progressively increasing thresholds from the identified threshold range [9]. At each iteration, pixels in a binary image with a corresponding image pixel gray level less than the threshold are turned "on", while those with a corresponding image pixel gray level greater than the threshold remain "off". An eight-point connectivity scheme is employed to construct contours around regions of contiguous "on" pixels [1]. The location of the centroid (center-of-mass) of each region relative to the peaks of a horizontal gray-level profile constructed through the centroid is used to determine whether the region is located within lung, as is understood in relation to FIG. 5.

Figure 5A:
FIG. 5 is a diagram illustrating the binary image resulting from application of an intermediate threshold value to the image shown in FIG. 2, depicting horizontal gray-level profiles through the centroids of two "on" regions.
Figure 5B:
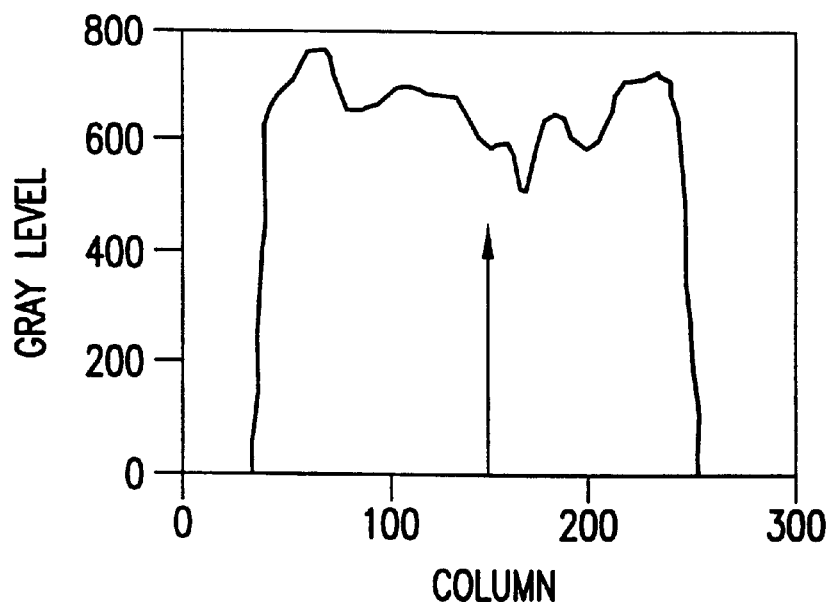
Figure 5C:
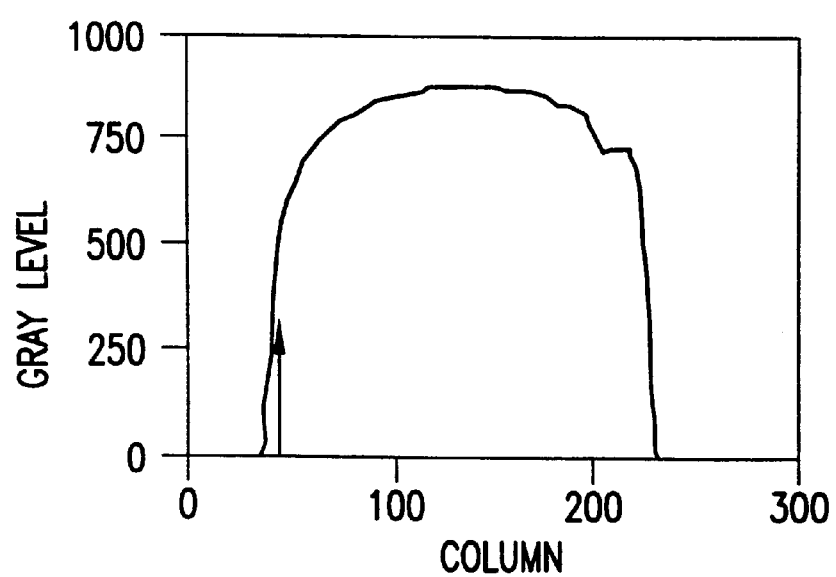

FIG. 5 illustrates the binary image resulting from application of an intermediate threshold value to the image shown in FIG. 2. Horizontal profiles through the centroids of two "on" regions are shown. Arrows indicate centroid positions. The lower region is determined to be outside the lung; the corresponding image pixels will consequently be set to 0. If the region is determined to be outside the lungs, the image pixels within the region are set to 0 to prevent these pixels from contributing to contours at later iterations. At each of the final three iterations, a morphological open operation is performed on the binary image prior to implementation of the centroid check. This, along with implementation of a minimum compactness [11] requirement, is done to eliminate slender artifacts in the binary image that may result from turning "off" regions at earlier iterations. The contour constructed at the last iteration of the global gray-level thresholding process is the "initial lung region contour".

The initial lateral contour does not fully capture the true lung region. Important areas such as the lung apex and cardiac silhouette tend to be excluded from the contour, while other regions may be incorrectly included. To correct these situations, adaptive local gray-level thresholding is performed. Small ROIs with an empirically determined base size of 31×31 pixels (38.0 mm×38.0 mm) are centered at every 30th pixel along the initial contour. Gray-level analysis is performed on pixels within each ROI that have not been identified as direct-exposure or subcutaneous pixels, and a gray-level threshold is determined separately for the individual ROIs. A composite binary image is constructed by thresholding the pixels in each ROI based on the threshold value selected for that ROI. This binary image is then used to construct the final contour.

Figure 7:
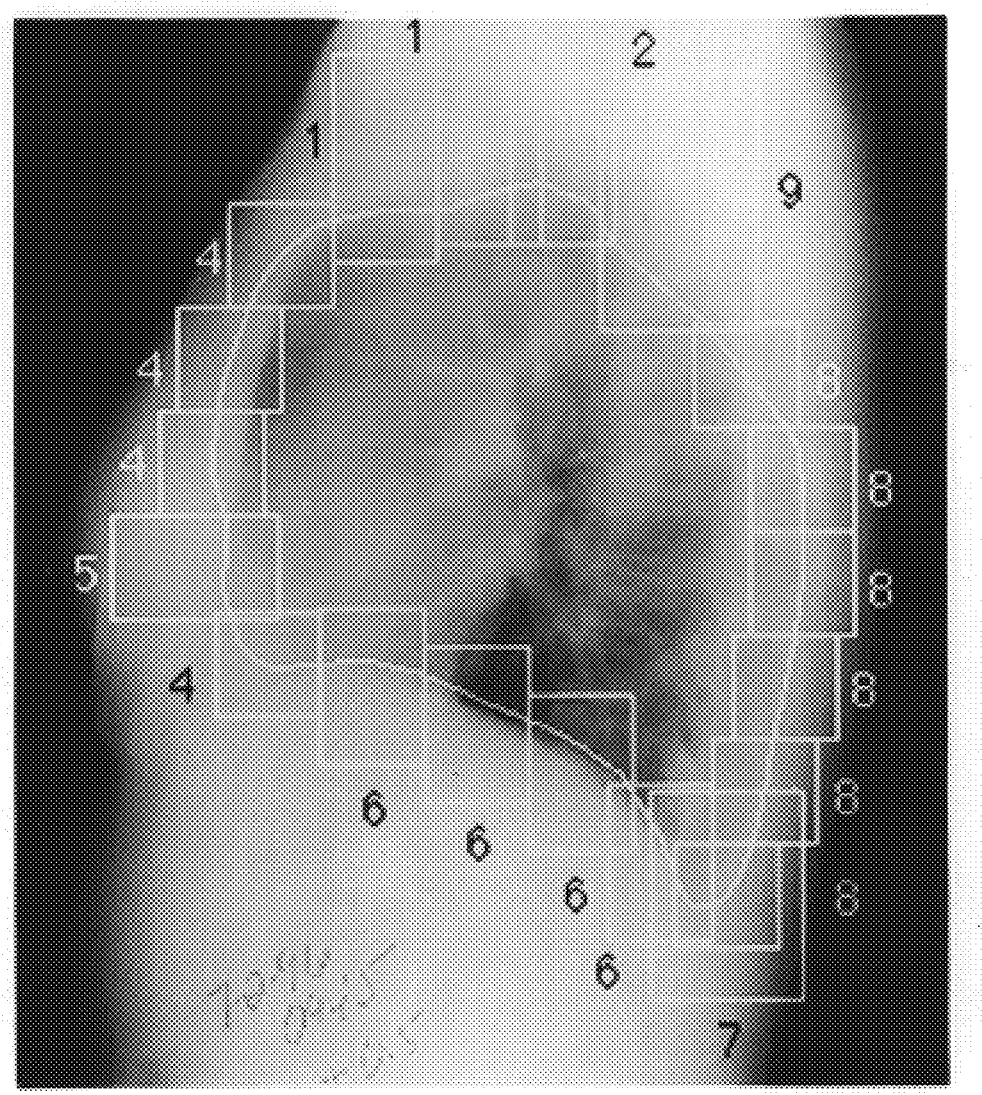
FIG. 7 illustrates the placement of ROIs for adaptive local thresholding shown overlaid on the initial lung region contour for the image shown in FIG. 2, with ROI dimensions depending on the anatomic region overlapped by the ROI as summarized in FIG. 6.

The anatomic region encompassed by each base ROI (31×31 pixels) is first determined from its location along the initial contour. This location category is used to determine (1) the final dimensions of the ROI and (2) the method by which the corresponding gray-level threshold for the ROI is calculated. Five main location categories are used: apex, sternum, cardiac silhouette, diaphragm, and spine. Two additional categories are reserved for the ROI containing the lung apex point determined at the beginning of the scheme and for a supplemental ROI specifically placed to overlap the cos tophrenic angle. The superiormost ROIs in the "sternum" and "spine" categories may be assigned new categories (for a total of nine possible categories) depending on the gray-level distribution of pixels in these ROIs. Based on the assigned category, the size of the ROI may be altered, and the method used to calculate the threshold is determined as summarized. FIG. 6 presents a summary of dimensions and threshold value calculations by location category for local thresholding ROIs. FIG. 7 depicts the placement of local thresholding ROIs along the initial contour for the image shown in FIG. 2 obtained from the iterative global gray-level thresholding procedure. Note the ROI dimensions in different anatomic regions. Each ROI is denoted with its computer-determined anatomic category as summarized in FIG. 6. Each ROI in FIG. 7 demonstrates its final dimensions in accordance with its assigned location category.

In general, the initial contour fails to fully capture the lung apex. To extend the final contour more superiorly into the apex, local thresholding ROIs in the apical region are elongated in the vertical direction (FIG. 6). Apex ROIs are identified by first defining as a horizontal boundary the image row containing the superiormost point of the initial contour. Any ROI centered on an initial contour point that is within one base ROI dimension (31 pixels) of this row is defined as an apex ROI, and the upper edge of the ROI is extended one base dimension higher, effectively doubling the vertical dimension of the ROI. The calculated gray-level threshold for an apex ROI is then taken to be the average gray level of pixels within the ROI but outside the initial contour. This calculation will necessarily yield a higher threshold, thereby forcing the final contour to include a greater portion of the dense apex region. A special location category is assigned to that apex ROI containing the pixel previously identified as the lung apex point. The gray-level threshold applied to this ROI is the gray level of the lung apex point.

ROI placement proceeds in a counterclockwise manner starting with the superiormost contour point of the initial contour. Accordingly, ROIs following apex ROIs are identified as sternum ROIs. These ROIs maintain the base dimension, and the gray-level threshold used is the average pixel value of ROI pixels. The sternum ROIs are used in a simplistic manner to check for the possible failure of the global thresholding scheme. If the bottom edge of a sternum ROI is within 40 rows of the last image row, the thresholds used for global thresholding are assumed to have been too high. The thresholds are accordingly lowered, and the global thresholding scheme is repeated.

The first ROI identified as a diaphragm ROI has an anterior edge that is posterior to the posterior edge of the second previous ROI. This rule follows from the posterior trend of the lung boundary as it proceeds from the anterior aspect to the diaphragm. Subsequent ROIs are designated diaphragm ROIs until the inferiormost initial contour point is reached. The vertical dimension of diaphragm ROIs is increased to 1.5 times the base size by lowering the lower edge of the ROI, thus enabling the ROI to capture pixels with higher gray levels. The threshold is defined as the mean gray level of pixels within the ROI. Once these thresholds are calculated, the threshold for a particular diaphragm ROI is set to the greater of the original threshold for that ROI and the average threshold of that ROI and the two adjacent ROIs.

The ROI containing the inferiormost initial contour point is identified as the first spine ROI. All ROIs counterclockwise from this one are so designated until an apex ROI is encountered. With the exception of the superiormost spine ROI (the upper edge of which is raised by the base dimension in order to include a greater portion of the shoulder region), these ROIs remain at the base size. The threshold used is one standard deviation above the mean gray level of pixels in the ROI, unless this value is less than 40 below the thresholds calculated for both adjacent ROIs. The regions of transition between ROIs assigned different location categories require additional consideration. If, for example, more than one-third of the pixels in an apex ROI is within direct-exposure or subcutaneous regions, this ROI is reclassified as a sternum ROI. Since the dimensions of apex ROIs are extended to encompass more pixels in the relatively radio-opaque apex, an apex ROI that contains a substantial number of direct-exposure or subcutaneous pixels must necessarily be located far enough away from the lung apex to warrant categorizing it as sternum. Regardless of whether an apex ROI is reclassified, the first (i.e., superiormost) sternum ROI is assigned its own location category, and the threshold is calculated from the weighted average of thresholds in immediately adjacent ROIs. More weight is given to the previous ROI, which presumably has a higher threshold due to its apex designation.

Similarly, if the patient's upper thoracic spine curves in such a way that superiorly located spine ROIs begin to shift anteriorly, these ROIs are designated shoulder ROIs; their upper edge is extended 1.5 times the base dimension, their posterior edge is extended posteriorly 0.5 times the base dimension, and the assigned threshold is the mean gray level of ROI pixels plus 0.5 standard deviations. This procedure is required to capture the radiographically dense region along the posterior aspect of the lung apex.

The transition region that receives the most scrutiny is between sternum and diaphragm ROIs. This is the portion of the lateral image occupied by the cardiac silhouette, which is often dense enough to be excluded from the initial lung contours. If the initial lung contour exhibits a concave shape around the cardiac region, indicating that the cardiac silhouette was excluded from the contour, the ROIs placed along this portion of the initial contour are categorized as cardiac ROIs.

The anterior edge of a cardiac ROI is extended anteriorly until its lower corner is aligned with the subcutaneous region. Each row in the ROI is examined. Beginning with the anterior edge, pixels are checked until a pixel is reached with gray level less than or equal to 97% the value of the maximum pixel gray level previously encountered in that row. Only pixels posterior to this pixel are turned "on" in the composite binary image.

The final location category belongs to the ROI overlapping the CP angle. The ROI containing the inferiormost initial contour point (previously designated "spine") is classified as the CP angle ROI. Both anterior and posterior edges are extended outwards to yield a horizontal dimension 1.5 times the base dimension, while both upper and lower edges are expanded to yield a vertical dimension twice the base dimension. The threshold applied to the CP angle ROI is the greater of the mean gray level of ROI pixels and the threshold previously calculated for the spine ROI that was effectively replaced by the CP angle ROI.

The calculated gray-level thresholds are then applied to pixels within the individual ROIs such that pixels with gray levels less than the threshold are turned "on" to form a composite binary image. A contour is then constructed around the "on" regions of this composite binary image to produce the final contour.

Since the contours tend to appear somewhat irregular, a smoothing scheme is applied that utilizes a running mean algorithm. This substitutes for the x- and y-positions of each contour point the average x- and y-positions of eleven preceding and eleven succeeding contour points. In addition, points that are redundant in an eight-point connectivity sense are eliminated.

Figure 8:
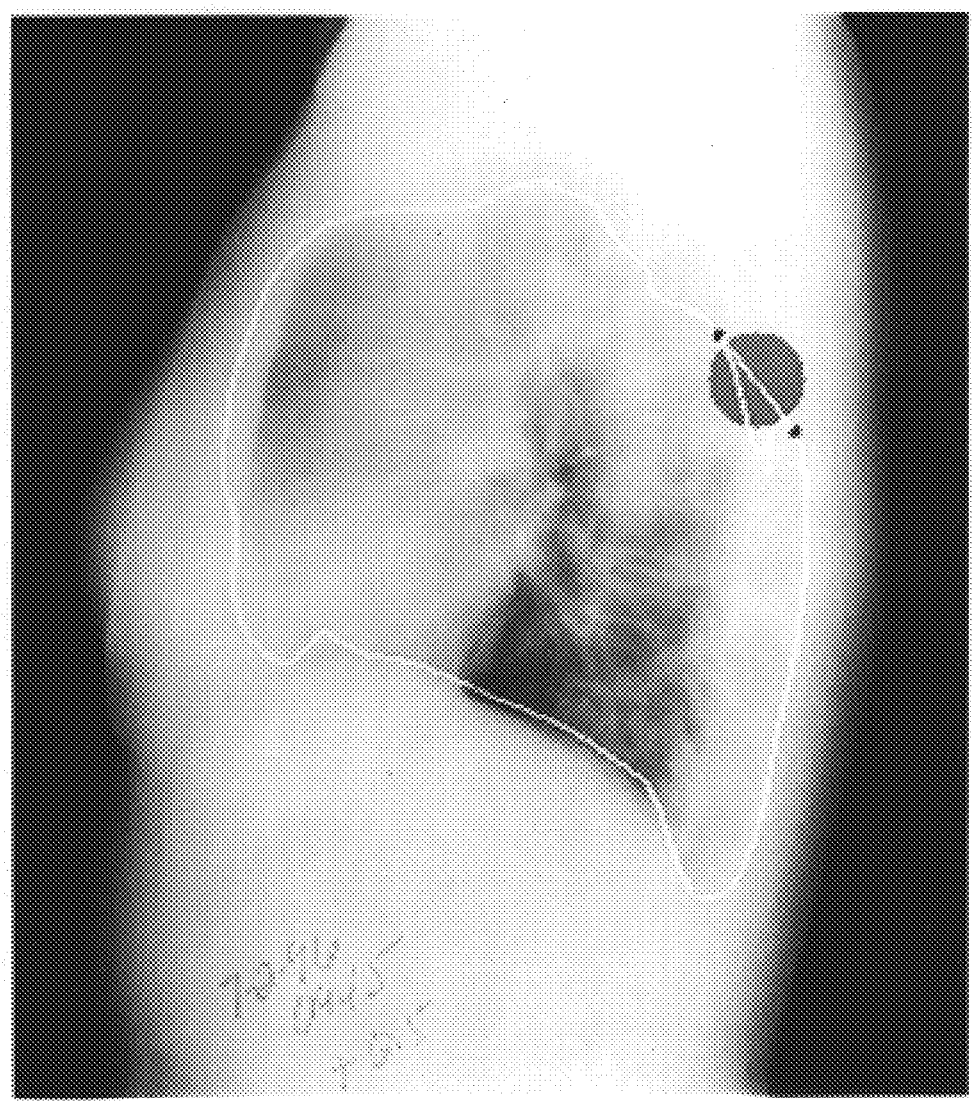
FIG. 8 demonstrates the application of the rolling ball technique in identifying and eliminating concavities in the contour.

Large-scale concavities remaining after initial smoothing are bridged using a rolling ball algorithm [12]. A ball filter with radius 29 pixels is applied only to the external aspect of the final lateral contour. The ball is placed tangential to the contour at every contour point. If a concavity of the proper scale is encountered, the contour will overlap the ball at some contour point beyond the point of contact between the ball and the contour. Linear interpolation is used to bridge the contour and eliminate the concavity as shown in FIG. 8, which demonstrates the rolling ball technique bridging a concavity in the initial contour. The running mean and rolling ball algorithms are applied twice during the segmentation: once to the initial contour prior to local thresholding and once to the final contour.

Figure 9:
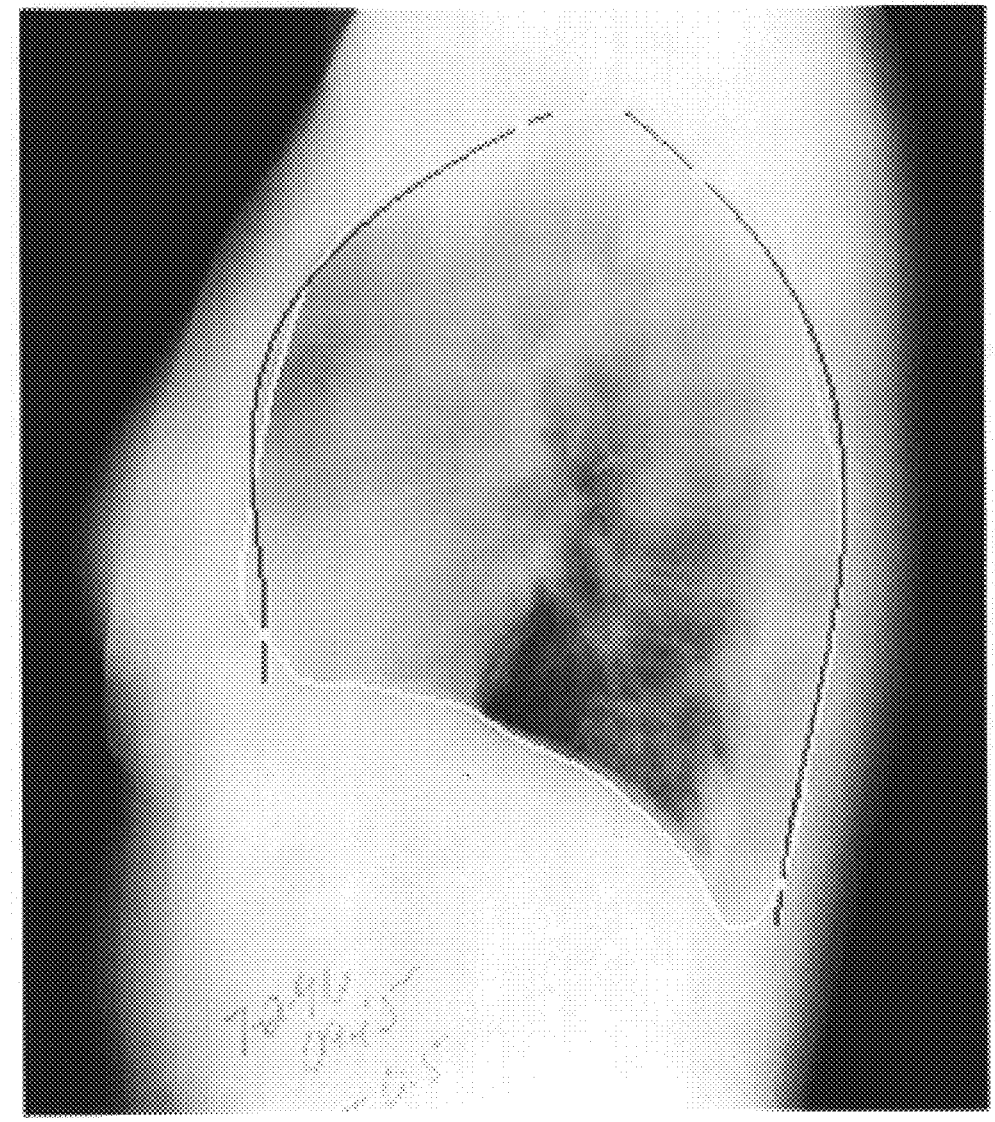
FIG. 9 depicts the anterior and posterior third-order least-squares polynomials overlaid on the final lung contour obtained for the image shown in FIG. 2.
Figure 10A:
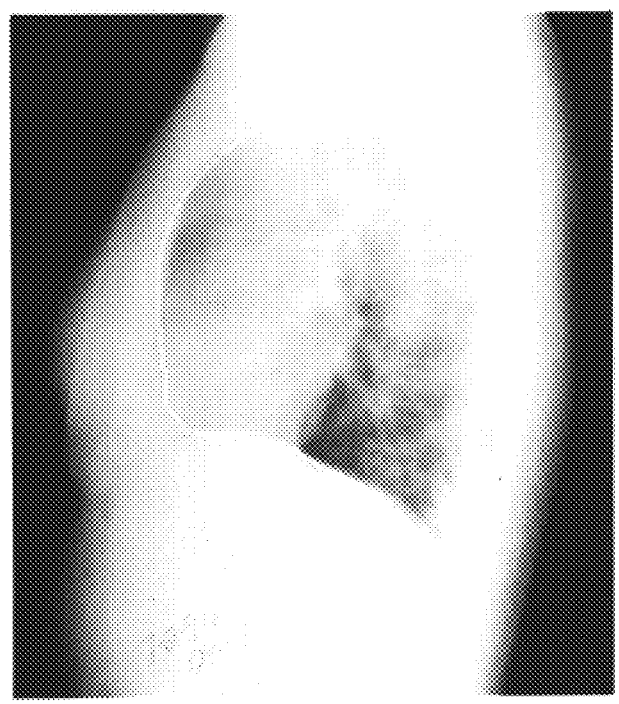
FIG. 10 presents the final lateral lung contour shown for (a) a normal case and (b) an abnormal case demonstrating pleural effusion in the right hemithorax with large opacities in the lower lobes of both lungs.
Figure 10B:
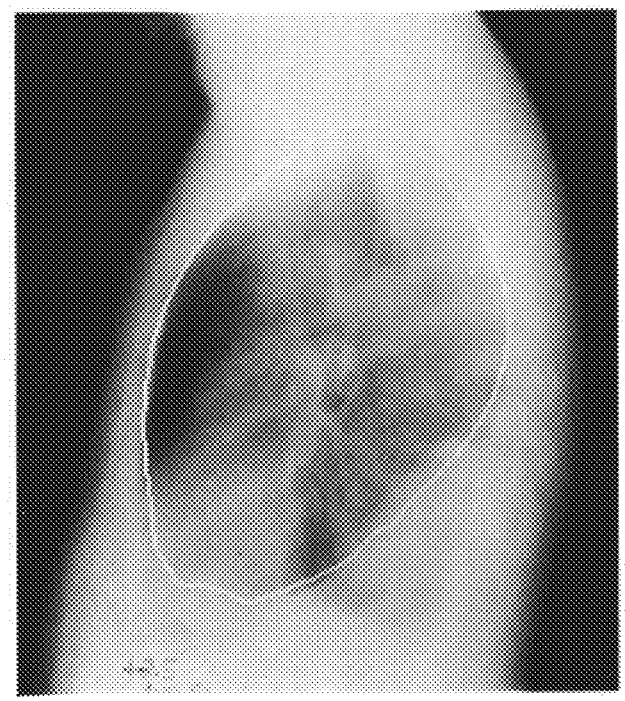

Lastly, polynomial curve-fitting is independently applied to both anterior and posterior aspects of the final contour. The lung apex and diaphragm are not subjected to curve-fitting. A third-order polynomial of the form $y=ax^3+bx^2+cx+d$ is used [13]. Computations for the anterior and posterior least-squares polynomials utilize contour points extending from the superiormost contour point to the contour point closest to the bottom left and bottom right corners of the image, respectively. Only every fourth contour point between these endpoints is used in order to reduce computation time. The two curves are then spliced into the lung contour. The superiormost and inferiormost points of intersection between the lung contour and the curve segment are defined as splice points; the polynomial curve is substituted for contour points between these splice points, while contour points outside these splice points remain unaffected. In FIG. 9, the anterior and posterior-third-order least-squares polynomials are shown overlaid on the final lung contour obtained for the image shown in FIG. 2. Splice points between which the final contour will be substituted with the polynomials are indicated by the two pairs of dots. The lateral lung segmentation is now complete. FIG. 10 shows the final lateral lung-contour for (a) a normal case and (b) an abnormal case demonstrating pleural effusion in the right hemithorax with large opacities in the lower lobes of both lungs.

Figure 11:
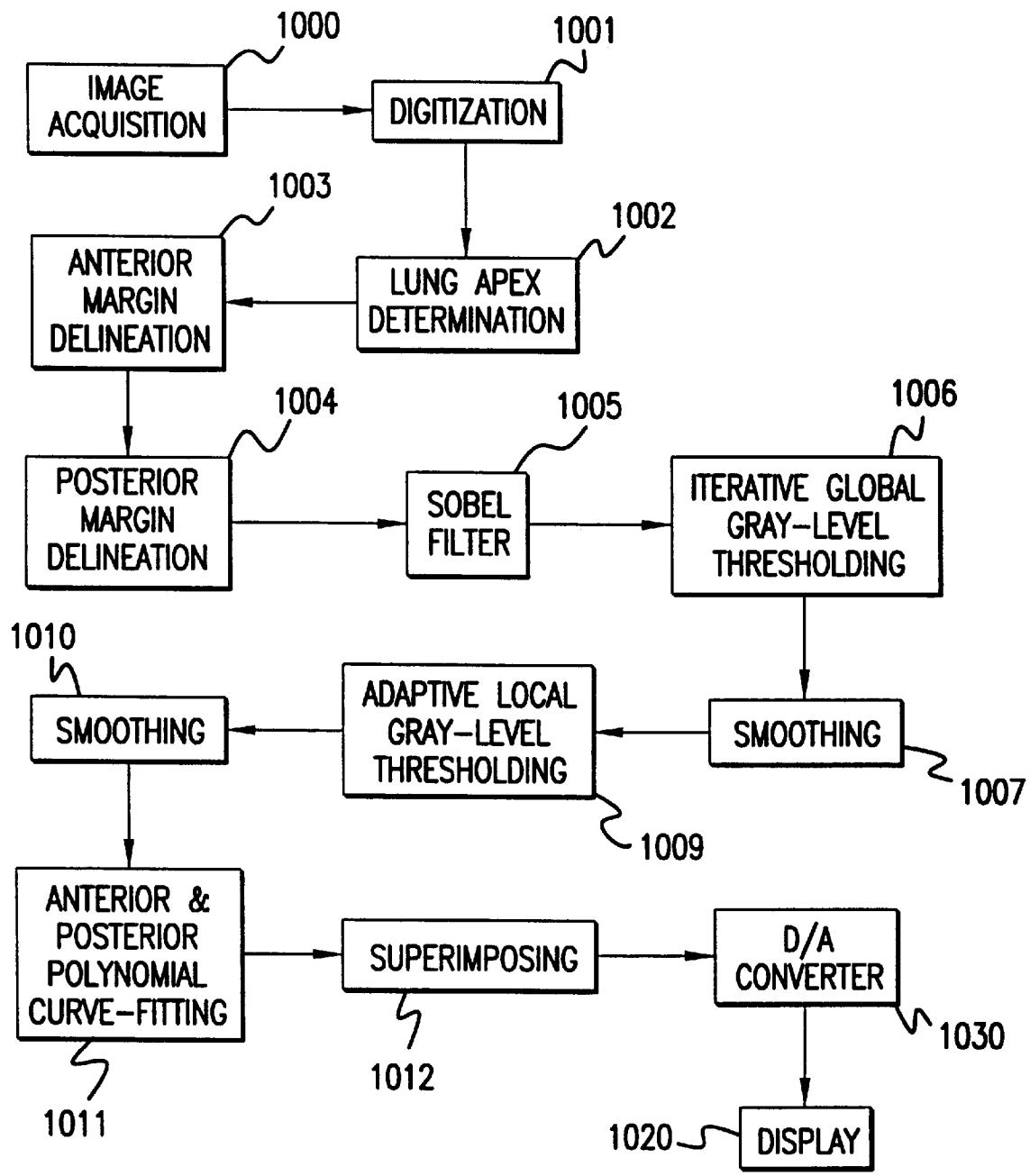
FIG. 11 is a more detailed schematic block diagram illustrating a system for implementing the method of the invention for the segmentation of lung regions in lateral chest radiographs.

FIG. 11 illustrates an example of a system of the invention implementing the functionality above-described. As shown in FIG. 11, lateral radiographs of an object are obtained from an image acquisition device and input to the system (1000). Each image is digitized and put into memory (1001). If the image is obtained with a direct digital device then there is no need for digitization. The image data is first passed through the lung apex determination circuit (1002), and then to the anterior and posterior margin delineation circuits (1003 & 1004) and also to the Sobel filter circuit (1005). The data is passed through to the iterative global gray-level thresholding circuit (1006). Contour data from the iterative global gray-level thresholding circuit are passed to the smoothing circuit (1007) and then through to the adaptive local gray-level thresholding circuit (1009). Contour data from the adaptive local gray-level thresholding circuit are then passed to the smoothing circuit (1010) and to the anterior and posterior polynomial curve-fitting circuits (1011). In the superimposing circuit (1012) the results are either superimposed onto images, stored in file format, or given in text format. The results are then displayed on the display system (1020) after passing through a digital-to-analog converter (1030). The system of the invention can be implemented in an appropriately programmed digital computer, as disclosed in one or more of the above-referenced patents and patent applications.

Obviously, numerous modifications and variations of the present invention are possible in light of the above teachings. It is therefore to be understood that within the scope of the appended claims, the invention may be practiced otherwise than as specifically described herein.

APPENDIX

References

1. R. D. Kittredge, B. Gamboa, and H. G. Kemp, "Radiographic visualization of left ventricular aneurysms on lateral chest film," AJR 126, 1140–1146 (1976).
2. G. Hillerdal, "Value of the lateral view in diagnosing pleural plaques," Arch. Environ. Health 4 1, 391–392 (1986).

3. G. J. Harris, P. K. Harman, J. K. Trinkle, and F. L. Grover, "Standard biplane roentgenography is highly sensitive in documenting mediastinal masses," Ann. Thorac. Surg. 44, 238–241 (1987).
4. I. Meschan, Roentgen signs in diagnostic imaging Vol. 4 chest (W. B. Saunders Company, Philadelphia, Pa., 1987).
5. H. S. Glazer, D. J. Anderson, B. S. Wilson, P. L. Molina, and S. S. Sagel, "Pneumothorax: appearance on lateral chest radiographs," Radiology 173, 707–711 (1989).
6. R. H. Daffner, Clinical radiology: the essentials (Williams & Wilkins, Baltimore, Md., 1993).
7. L. M. Boxt, K. Reagan, and J. Katz, "Normal plain film examination of the heart and great arteries in the adult," J. Thorac. Imaging 9, 208–218 (1994).
8. J. C. Russ, The image processing handbook (CRC Press, Inc., Boca Raton, =46L, 1995).
9. M. L. Giger, S. G. Armato, III, and H. MacMahon, "Automated method and system for the detection of gross abnormalities and asymmetries in chest images," U.S. Pat. No. 5,638,458 (1997).
10. K. T. Bae, M. L. Giger, C.-T. Chen, and C. E. Kahn, Jr., "Automatic segmentation of liver structure in CT images," Med. Phys. 20, 71–78 (1993).
11. M. L. Giger, K. T. Bae, and H. MacMahon, "Computerized detection of pulmonary nodules in computed tomography images," Invest. Radiol. 29, 459–465 (1994).
12. S. R. Stemberg, "Grayscale morphology," Computer Vision, Graphics, and Image Processing 35, 333–355 (1986).
13. J. H. Mathews, Numerical methods for mathematics, science, and engineering (Prentice Hall, Englewood Cliffs, N.J., 1992).

What is claimed as new and desired to be secured by Letters Patent of the United States is:

1. A method for the automated segmentation of the lung region in lateral chest radiographic images, comprising:
    obtaining first image data representing the thorax of a laterally positioned patient;
    pre-processing said first image data to produce second image data;
    delineating approximate anterior and posterior margins in said second image data to produce third image data,
    performing iterative global gray-level thresholding on said third image data to identify a first initial lung segmentation contour; and
    smoothing said first initial lung segmentation contour to produce a second initial lung segmentation contour.

2. The method according to claim 1, further comprising:
    performing adaptive local gray-level thresholding within regions-of-interest positioned along said second initial lung segmentation contour to identify a first final lung segmentation contour; and
    smoothing said first final lung segmentation contour to produce a second final lung segmentation contour.

3. The method according to claim 2, wherein said performing adaptive local gray-level thresholding step comprises:
    placing N local regions-of-interest of a predetermined dimension centered at points along said second initial lung segmentation contour separated by a predetermined constant number of points;
    classifying each of said N local regions-of-interest as one of M anatomic location categories;
    adjusting said predetermined dimension of each of said N local regions-of-interest depending on a corresponding of said M anatomic location categories; and
    creating a composite binary image.

4. The method according to claim 3, wherein said creating step comprises:
    calculating N local gray-level thresholds for said N local regions-of-interest depending on the corresponding of said M anatomic location categories; and
    turning "on" pixels in said composite binary image that have corresponding pixels in each of said N local regions-of-interest in said third image data with values exceeding the corresponding of said N local gray-level thresholds.

5. The method according to claim 4, wherein said performing adaptive local gray-level thresholding step further comprises:
    constructing said first final lung segmentation contour around the region of contiguous "on" pixels in said composite binary image.

6. The method according to claim 2, wherein said smoothing said first final lung segmentation contour step comprises:
    applying a rolling ball filter to said first final lung segmentation contour to produce said second final lung segmentation contour.

7. The method according to claim 6, wherein said applying step comprises:
    constructing a circular filter of a predetermined constant value in radius;
    calculating a slope of a line tangent to each point of said first final lung segmentation contour;
    placing a contact point found on the perimeter of the circular filter successively on each point of said first final lung segmentation contour such that the slope of a line tangent to the circle perimeter of said circular filter at said contact point matches said slope of said line tangent to each point of said first final lung segmentation contour; and
    applying linear interpolation to bridge concavities identified when said ball filter contacts said first final lung segmentation contour at more than one point.

8. The method according to claim 2, wherein said smoothing said first final lung segmentation contour step further comprises:
    performing a running mean operation that replaces the position of each point of said first final lung segmentation contour with the average position of a predetermined constant number of adjacent contour points to construct a third final lung segmentation contour; and
    eliminating points in said third final lung segmentation contour that are redundant in an eight-point connectivity sense to construct said second final lung segmentation contour.

9. The method according to claim 2, wherein said smoothing said first final lung segmentation contour step further comprises:
    fitting separate polynomial functions to an anterior aspect of said first final lung segmentation contour and to a posterior aspect of said first final lung segmentation contour.

10. The method according to claim 9, wherein said fitting step comprises:
    identifying as anterior aspect points the points along said first final lung segmentation contour from a superior-most point of said first final lung segmentation contour counterclockwise to the point along said first final lung segmentation contour possessing the smallest geometric distance to the bottom anterior corner of said second image data;

fitting an anterior least-squares polynomial function to said anterior aspect points; and substituting said anterior aspect points with points derived from said anterior least-squares polynomial function between a superiormost anterior point of intersection and an inferiormost point of intersection of said first final lung segmentation contour and said anterior least-squares polynomial function;

identifying as posterior aspect points the points along said first final lung segmentation contour from a superiormost point of said first final lung segmentation contour clockwise to the point along said first final lung segmentation contour possessing the smallest geometric distance to the bottom posterior corner of said second image data; and fitting a posterior least-squares polynomial function to said posterior aspect points; and substituting said posterior aspect points with points derived from said posterior least-squares polynomial function between a superiormost point of intersection and an inferiormost point of intersection of said first final lung segmentation contour and said posterior least-squares polynomial function, thereby constructing said second final lung segmentation contour.

11. The method according to claim 1, wherein said pre-processing step comprises:

identifying bottom collimation regions of said first image data;

identifying side collimation regions of said first image data; and setting to zero the values of pixels in said collimation regions.

12. The method according to claim 11, wherein said step of identifying bottom collimation regions comprises:

comparing the initial and final pixel values of a bottom row of said first image data to a first predetermined constant value; and setting to zero the values of all pixels within said bottom row of said first image data when the value of said initial pixel or the value of said final pixel in said bottom row of said first image data exceeds said first predetermined constant value.

13. The method according to claim 12, further comprising:

(a) repeating said comparing and setting to zero steps for preceding rows until a first row is encountered in which neither the value of said initial pixel nor the value of said final pixel in said first row exceeds said first predetermined constant value;

(b) comparing the initial and final pixel values of a row preceding said first row of said first image data to a second predetermined constant value; and (c) setting to zero the values of all pixels within said row preceding said first row of said first image data when the value of said initial or final pixel in said row preceding said first row of said first image data exceeds said second predetermined constant value.

14. The method according to claim 13, comprising:

repeating said steps (b) and (c) for preceding rows until a second row is encountered in which neither the value of an initial pixel nor the value of a final pixel in said second row exceeds said second predetermined constant value.

15. The method according to claim 11, wherein said step of identifying side collimation regions comprises:

comparing the value of an initial pixel in each row of said first image data with a predetermined constant value; and setting to zero the value of said initial pixel when said initial pixel exceeds said predetermined constant value.

16. The method according to claim 15, comprising:

(a) repeating said comparing and setting to zero steps for subsequent pixels until a first pixel is encountered that does not exceed said predetermined constant value;

(b) comparing the value of a final pixel in each row of said first image data with said predetermined constant value; and (c) setting to zero the value of said final pixel when said final pixel exceeds said predetermined constant value.

17. The method according to claim 16, comprising:

repeating said steps (b) and (c) for pixels preceding said final pixel until a second pixel is encountered that does not exceed said predetermined constant value.

18. The method according to claim 1, wherein said pre-processing step comprises:

identifying and suppressing direct-exposure and subcutaneous regions from said first image data.

19. The method according to claim 18, wherein said identifying and suppressing step comprises:

setting pixels subsequent to an initial pixel consecutively in each row to zero until a first pixel is encountered with a value exceeding a predetermined multiple of the smallest pixel value encountered subsequent to said initial pixel; and calculating an average of N pixels subsequent to said first pixel in the same row; and setting pixels subsequent to said first pixel consecutively to zero until a second pixel is encountered with a value exceeding said average of N pixels subsequent to said first pixel.

20. The method according to claim 18, further comprising:

setting pixels prior to a final pixel to zero until a third pixel is encountered with a value exceeding a predetermined multiple of the smallest pixel value encountered since said final pixel; and calculating an average of N pixels prior to said third pixel in the same row; and setting pixels prior to said third pixel to zero until a fourth pixel is encountered with a value exceeding said average of N pixels prior to said third pixel.

21. The method according to claim 1, wherein said pre-processing step further comprises:

locating a lung apex position in said first image data.

22. The method according to claim 21, wherein said locating step comprises:

calculating N average rows based on an average of a predetermined number of rows in said second image data;

constructing N horizontal gray-level profiles from said N average rows; and performing a running mean operation to smooth said N horizontal gray-level profiles and produce smoothed N horizontal gray-level profiles.

23. The method according to claim 22, wherein said locating step comprises:

performing a slope technique to determine a plurality of gray-level maxima and a plurality of gray-level minima in said smoothed N horizontal gray-level profiles; and searching said smoothed N horizontal gray-level profiles for a first profile representing the superiormost of said smoothed N horizontal gray-level profiles with a lowest gray-level minimum positioned between two gray-level maxima with gray levels exceeding a predetermined multiple of the value of said gray-level minimum.

24. The method according to claim 23, wherein said locating step further comprises:

identifying as a lung apex y-position the row of said first profile; and identifying as a lung apex x-position a column containing said lowest gray-level minimum of said first profile.

25. The method according to claim 24, wherein said delineating step comprises:

identifying as a first anterior margin point in an initial row in said second image data below said lung apex y-position the first pixel extending posteriorly to the anterior side encountered with a value below a predetermined multiple of a largest pixel value between the anterior side of said initial row and said first anterior margin point; and identifying as a first posterior margin point in said initial row in said second image data the first pixel extending anteriorly to the posterior side encountered with a value below a predetermined multiple of a largest pixel value between the posterior side of said horizontal gray-level profile and said first posterior margin point.

26. The method according to claim 25, comprising:

repeating said constructing and identifying steps for subsequent rows in said second image data until a collection of said first anterior margin points and a collection of said first posterior margin points is obtained.

27. The method according to claim 26, wherein said delineating step further comprises:

smoothing said collection of first anterior margin points and said collection of first posterior margin points independently through a running mean technique to obtain a collection of second anterior margin points and a collection of second posterior margin points.

28. The method according to claim 27, wherein said smoothing step comprises:

determining for each row respective average locations for the first anterior margin points and the first posterior margin points, based on the average of locations of the first anterior martin points and first posterior margin points in plural adjacent rows including the row for which the respective average locations are to be determined; and replacing the location of each of said first anterior margin points and said first posterior margin points with the respective average locations to produce said second anterior margin points and said second posterior margin points.

29. The method according to claim 28, comprising:

iteratively repeating said determine step and said replacing step until pluralities of said second anterior margin points and pluralities of said second posterior margin points define continuous segments that exceed a predetermined constant value in length.

30. The method according to claim 29, wherein said delineating step further comprises:

setting to zero in said second image data all pixels that lie anterior to said second anterior margin points and posterior to said second posterior margin points.

31. The method according to claim 1, wherein said delineating step comprises:

applying a Sobel filter to the bottom half of said first image data to create Sobel-filtered image data comprising, setting the values of pixels in said second image data to a first predetermined constant value when the corresponding pixel in said Sobel-filtered image data exceeds a second predetermined constant value.

32. The method according to claim 1, wherein said performing iterative global gray-level thresholding step comprises:

identifying a range of gray-level threshold values; and selecting N gray-level threshold values from said range of gray-level threshold values.

33. The method according to claim 32, wherein said identifying step comprises:

constructing a global gray-level histogram from the pixels contained within a large region-of-interest of predetermined dimension;

analyzing the slope of said global gray-level histogram to identify a lung peak comprised of pixels belonging predominantly to the lung and a minimum between said lung peak and a peak comprised of pixels belonging predominantly to the spine, sternum, shoulder, and subdiaphragmatic regions; and identifying as lower bound of said range of gray-level threshold values the gray level at which said lung peak occurs in said global gray-level histogram;

identifying as an upper bound of said range of gray-level threshold values the gray level at which said minimum occurs in said global gray-level histogram.

34. The method according to claim 32, wherein said performing iterative global gray-level thresholding step further comprises:

creating a first binary image based on said second image data by turning "on" pixels in said second image data with values less than the first of said N gray-level threshold values and greater than a predetermined lower limit value;

identifying regions of contiguous "on" pixels; and calculating a center-of-mass in each of said regions of contiguous "on" pixels; and determining which of said regions of contiguous "on" pixels exist outside of the lung region;

suppressing regions of contiguous "on" pixels in said second image data determined to exist outside the lung regions.

35. The method according to claim 34, wherein said determining step comprises:

generating a horizontal gray-level profile through the center-of-mass of each of said regions of contiguous "on" pixels;

identifying maxima and minima in said gray-level profiles using a slope technique;

comparing the gray-level value of said horizontal gray-level profile at a position of the center-of-mass with the gray-level values of said maxima and minima to determine those of said regions of contiguous "on" pixels that exist outside the lung regions.

36. The method according to claim 35, wherein said suppressing step comprises:

setting to zero the pixels of said second image data corresponding to those pixels within said regions of contiguous "on" pixels in said first binary image determined to exist outside the lung regions;

further comprising:
  repeating said creating, identifying, calculating, generating, identifying maxima and minima, and comparing steps for each of said N gray-level threshold values; and
  repeating said setting to zero step for all said regions of contiguous "on" pixels.

37. The method according to claim 34, 35 or 36, wherein said step of performing iterative global gray-level thresholding is repeated for each of said N gray-level threshold values.

38. The method according to claim 1, wherein said performing iterative global gray-level thresholding step comprises:
  outlining said first initial lung segmentation contour around a region of contiguous "on" pixels that results after N iterations of global gray-level thresholding.

39. The method according to claim 1, wherein said smoothing step comprises:
  applying a rolling ball filter to said first initial lung segmentation contour to produce said second initial lung segmentation contour.

40. The method according to claim 39, wherein said applying step comprises:
  constructing a circular filter of a predetermined constant value in radius;
  calculating a slope of a line tangent to each point of said first initial lung segmentation contour;
  placing a contact point found on the perimeter of the circular filter successively on each point of said first initial lung segmentation contour such that the slope of a line tangent to the circle perimeter of said circular filter at said contact point matches said slope of a line tangent to each point of said first initial lung segmentation contour; and
  applying linear interpolation to bridge concavities identified when said ball filter contacts said first initial lung segmentation contour at more than one point.

41. The method according to claim 1, wherein said smoothing step further comprises:
  performing a running mean operation that replaces the position of each point of said first initial lung segmentation contour with an average position of a predetermined constant number of adjacent contour points to construct a third initial lung segmentation contour; and
  eliminating points in said third initial lung segmentation contour that are redundant in an eight-point connectivity sense to construct said second initial lung segmentation contour.

42. A system for the automated segmentation of the lung region in lateral chest radiographic images, comprising:
  means for obtaining image data that represents the thorax of a laterally positioned patient;
  means for delineating margins that encompass the portion of image data;
  means for performing iterative global gray-level thresholding and adaptive local gray-level thresholding to produce a lung segmentation contour
  means for smoothing the lung segmentation contour; and
  means for indicating a final contour on a lateral chest image.

43. An image processing apparatus configured to perform each of the steps recited in one of claims 1, 2, 14, 17, 20, 22, 31, 26, 29, 33, 36, 40, 4, 8, and 10.

44. A storage medium storing a program for performing each of the steps recited in one of claims 1, 2, 14, 17, 20, 22, 31, 26, 29, 33, 36, 40, 4, 8, and 10.

* * * * *

UNITED STATES PATENT AND TRADEMARK OFFICE
CERTIFICATE OF CORRECTION

PATENT NO. : 6,335,980 B1
DATED : January 1, 2002
INVENTOR(S) : Samuel G. Armato, III et al.

It is certified that error appears in the above-identified patent and that said Letters Patent is hereby corrected as shown below:

<u>Title page,</u>
Item [75], change "Macmahon" to -- MacMahon --.

<u>Column 3,</u>
Lines 10 and 11, change "detection and classification of masses in breast images" to -- segmentation of lung regions in lateral chart radiographs --.

<u>Column 5,</u>
Line 49, change "cos tophrenic" to -- costophrenic --.

<u>Column 8,</u>
Line 17, change "posterior-third-order" to -- posterior third-order --.

<u>Column 13,</u>
Line 17, change "to" to -- from --; and
Line 24, change "to" to -- from --.

Signed and Sealed this

Twenty-fifth Day of June, 2002

*Attest:*

JAMES E. ROGAN
*Attesting Officer*   *Director of the United States Patent and Trademark Office*